(No Model.)

M. H. ROWLAND.
EDUCATIONAL TOY OR DEVICE.

No. 462,997. Patented Nov. 10, 1891.

WITNESSES:
Fred G. Dieterich
H. J. Robinson.

INVENTOR:
Milton H. Rowland
BY Munn & Co
ATTORNEYS

UNITED STATES PATENT OFFICE.

MILTON H. ROWLAND, OF GLADSTONE, MICHIGAN, ASSIGNOR OF ONE-HALF TO J. WALTON PENNOCK, OF SAME PLACE.

EDUCATIONAL TOY OR DEVICE.

SPECIFICATION forming part of Letters Patent No. 462,997, dated November 10, 1891.

Application filed April 28, 1891. Serial No. 390,874. (No model.)

*To all whom it may concern:*

Be it known that I, MILTON H. ROWLAND, residing at Gladstone, Delta county, Michigan, have invented a new and useful Improvement in Educational Toys or Devices, of which the following is a specification.

This invention relates to an improved educational toy or device whereby one may be taught to spell, read, and figure correctly, and also to distinguish colors.

The object of my invention is to combine the educational device with a toy in such a manner that it will appeal to the eye of a child and serve to amuse as well as instruct; and with this object in view my invention consists of a suitable base having the alphabet and Arabic numerals marked thereon, each letter or figure having a perforation made therein adapted to receive a peg or pin, the said pegs or pins being differently colored, whereby a knowledge of colors is imparted.

Figure 1:
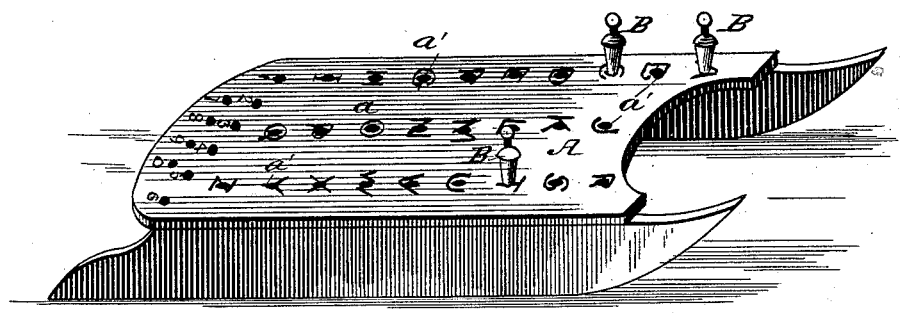
Figure 2:
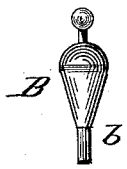

In the drawings forming a part of this invention, Figure 1 is a perspective view of my invention, and Fig. 2 is a detail view of one of the pegs.

Referring to the drawings, A indicates a toy sled, though a wagon, chair, or other toy may be employed, if desired, and upon the top $a$ of the sled or the bottom of the wagon or chair are marked the letters of the alphabet and the Arabic numerals, the said top $a$ forming a suitable base, which is provided with a series of perforations $a'$, each perforation passing through a letter or numeral, as clearly shown, and in connection with the perforated base having the alphabet and numerals marked thereon I employ a series of pegs or pins B, painted in different colors, the said pegs or pins being of any approved pattern, and usually provided with a reduced end or tenon $b$, which fits the perforation $a'$.

In operation the pegs or pins B are arranged in various perforations $a'$ and upon the letters and figures, thus marking out words and sentences and indicating numbers, teaching orthography, reading, notation, and numeration in a simple device that may also be employed as a toy, and as the pegs or pins are painted in different colors a knowledge of colors may also be obtained therefrom.

Having thus described my invention, I claim and desire to secure by Letters Patent—

An improved educational toy consisting of a suitable base having the letters of the alphabet and the Arabic numerals marked thereon, said base having a series of perforations produced therein, each perforation being arranged to pass through a separate character, and a series of detachable interchangeable pins having reduced ends adapted to fit the said perforations, whereby words and sentences may be blocked out, substantially as shown and described.

MILTON H. ROWLAND.

Witnesses:
RICHARD MERTZ,
EDWD. HUDSON.